Nov. 13, 1956

R. C. HAWES ET AL 2,770,531

METHOD AND APPARATUS FOR AUTOMATIC
TITRATION AND CONTROL OF VARIABLES

Filed March 3, 1951

INVENTORS.
ROLAND C. HAWES
ALLEN STRICKLER
BY THEIR ATTORNEYS.
HARRIS, KIECH, FOSTER & HARRIS
BY

2,770,531

METHOD AND APPARATUS FOR AUTOMATIC TITRATION AND CONTROL OF VARIABLES

Roland C. Hawes, Los Angeles, and Allen Strickler, Burbank, Calif., assignors to Beckman Instruments, Inc., South Pasadena, Calif., a corporation of California Application March 3, 1951, Serial No. 213,724

13 Claims. (Cl. 23—230)

Our invention relates to the control of variables in systems characterized by high inertia or equilibration time constants. More particularly, it relates to the control of rapid displacements or changes of a variable that are unidirectional and often irreversible. The invention also relates to the automatic titration of chemical solutions in which this problem is encountered with particular severity. The invention will be exemplified with relation to an automatic titrator, but merely as exemplary of one embodiment.

Examples of systems other than the automatic titrator and with which this invention is generally concerned are the following:

1. In a machine or structure, rapid unidirectional displacement of a massive member to a precise limit without overshooting.

2. In the control of furnaces or refrigeration devices of large thermal capacity, rapid elevation or depression of temperature to precise desired limits without exceeding these limits.

3. In weighing operations, dispensing of material up to but not exceeding a precise desired weight in the shortest possible time.

Controls in such systems, as well as in an automatic titrator, will often involve the use of a valve controlling the flow of material. The invention will be exemplified with relation to such a valve.

Our invention is contemplated for use in systems characterized by very high ratios, e. g., at least several hundred to one, between maximum or initial displacement velocity and terminal velocity to be accurately controlled near the limit. This condition poses serious difficulties or complexities for conventional control systems. It is an object of the present invention to provide a relatively simple system adequate to control displacements or other variables over a wide range of average velocity.

Titration is one example of a situation where it is desired to bring a changing value or variable (e. g., an electrochemical potential between two electrodes in a sample solution) up to a fixed or predetermined value (e. g., up to a potential corresponding to a desired end point) without overshooting. It is a general object of the invention to provide a novel method and apparatus for bringing such a changing value or variable up to another value without overshooting.

All of the suggested forms of the invention can be considered as involving changing and fixed values. These values may be electric values or may be translated into such electric values, e. g., electric currents, potentials, etc. The present invention contemplates the use of a third electric value, typically an electrical increment, which is effectively added to the changing electric value with the net result that the fixed electric value is reached prematurely to give a false signal or balance. At this time, the effect of the electrical increment is removed or reduced. In the meantime, the changing electric value may have increased toward the fixed electric value so that reapplying or increasing the electrical increment will again bring the system to another false balance. By thus applying progressively smaller electrical increments to produce a series of false balances, the changing electric value can be brought incrementally up to the fixed electric value without overshooting. Such overshooting would produce inaccurate results and with various automatic control equipment would initiate a hunting condition.

It is an object of the present invention thus to apply electrical increments of progressively decreasing effect, effectively adding these to a changing electric value to produce a series of false balances or signals before a condition of actual balance between the changing electric value and a fixed electric value is reached. It is another object of the invention to use such decreasing electrical increments as will be additive in effect to the changing electric value.

Another object of the invention is to apply the electrical increments and the changing electric value (or some net or input potential varying therewith) to an input means of an amplifier whereby the amplifier will be responsive to the resultant effect of the changing electric value and the increments.

A further object of the invention is to provide a null-sensing amplifier, the net or input electric value decreasing as the changing electric value approaches the fixed electric value.

Further general objects of the invention lie in the provision of a sensing means which will sense the change in a variable and which will actuate both a control device changing the variable and a supplementary means, this supplementary means producing a supplementary signal or effect which is delivered to the sensing means.

The titration operation, concerning which the invention will be particularly exemplified, is a familiar quantitative analytical technique employed daily in almost every chemical laboratory, typically by manual, time-consuming methods. Titrations are conventionally carried out by adding a titrant from a burette through a stopcock valve to the unknown sample solution, incremens of the titrant being added progressively to the sample until the end point, determinable by colorimetric, potentiometric or other means, is reached. If accurate results are to be obtained, the manual procedure is necessarily time-consuming and tedious, particularly as the final increments of titrant must be minute and added with great care if the end point is not to be exceeded. When, moreover, as frequently occurs, a large series of titrations is to be performed, operator fatigue becomes a truly serious problem since continuously maintained accuracy then becomes difficult or impossible. The usual manual titration requires a minimum of several minutes. It is an object of the present invention to provide a method and apparatus whereby this time can be reduced to about 1½ minutes or less.

In its titration aspects, the present invention is concerned particularly with the potentiometric method of titration, to which by far the larger number of titration determinations are adaptable, and which includes titrations of the neutralization, oxidation-reduction, precipitametric and complex formation types. It is an object of the present invention to provide an automatic device for titration to a predetermined or selected end point, which device is relatively simple, inexpensive, and easy to use, and highly accurate in eliminating errors due to personal factors. It is another object of the invention to provide an automatic titrator which can be set into operation to complete the titration without the personal supervision of a technician, thus enabling this technician to perform other operations during the titrating period. It is another object to provide an automatic titrator which eliminates fatigue caused by close observation required in manual procedures.

A general object of the invention lies in the provision of an automatic titrator usable with conventional burettes and which includes a control valve which automatically operates to discharge the titrant, the volume of titrant required to reach the end point being readable directly from the burette.

Another object of the invention is to provide a novel control for a titrant valve whereby the titrant may be delivered continuously to the sample until the end point is almost reached, whereupon the delivery of titrant becomes intermittent. A further object is to provide for such intermittent delivery during progressively shorter periods as the end point is approached.

Another object is to provide for delivery of the titrant during periods which are increasingly spaced apart as the end point is approached.

Another object is to provide an automatic titrator which will titrate accurately to a selected end point and then automatically stop.

A further object is to provide an extremely sensitive and accurate valve for controlling minute flows of the titrant, this valve being inert to acids, alkalis and oxidizing agents and having a closure member that can be easily replaced and inexpensively fabricated from a variety of suitable sheet materials, the valve having a rapid response time and having a very small internal volume, devoid of dead spaces not easily flushed or cleaned.

In potentiometric titration, the potential developed between a suitable pair of electrodes placed in the sample solution undergoes a continuous unidirectional change as the titrating solution is added, passing through a characteristic potential value when the end point or "equivalence point" is reached, and showing a particularly high rate of change in the vicinity of the end point.

Accordingly, titration is one example of a situation where it is desired to bring a controlled variable (e. g., an electrochemical potential between two electrodes) up to a fixed or predetermined limiting value (e. g., to a potential corresponding to the end point, by controlled addition of titrant) without overshooting. The invention includes among its objects the provision of a novel and generally applicable method and apparatus for accomplishing this.

Since, in automatic titration, maximum speed is essential, delivery of at least the larger part of the required titrant must be made at a relatively rapid rate. Near the end point, however, this is not permissible, inasmuch as certain delays inherent in the system, such as stirring time required to make the solution homogeneous, and amplifier and valve response times, would cause an extreme degree of overshooting to be apparent by the time the valve has been shut off. Accordingly, this system, like those cited earlier, presents the problems associated with high inertia or equilibration time. Displacement rate, then, must be limited in a controlled manner as the end point is approached, and means must be provided for anticipating the end point, and acting thereupon.

While the description and specific embodiment of our invention will be presented primarily in terms of the control of an irreversible delivery of solution and the control of a co-varying potential to a predetermined limit, the principle applies equally to any system having the properties which we have specified. Moreover, the variable to be controlled in such systems is frequently convertible into a correspondingly varying voltage or other electric value.

The present invention contemplates the use of a supplementary or biasing quantity of suitable magnitude which is in effect added to the variable to be controlled with the result that arrival at the end point or set limit is prematurely sensed. The system then responds by arresting, for the moment, further change or displacement in the controlled variable. Simultaneously with this response the supplement, or its effect upon the system, is removed or caused to decay in a controlled manner. This decay proceeds only part of the way toward a zero value, however, when the system shortly senses that the limit-arrival response was false or premature, so that further displacement toward the limit is then again permitted to occur. Simultaneously, the supplement is now again permitted to increase in magnitude. Before it has reached its former value, however, the system, now closer to the final displacement value, will again falsely sense arrival at the limit. By thus applying progressively smaller supplement values to produce a series of false arrival signals, the controlled variable can be brought incrementally up to the predetermined limit value without overshooting.

It is accordingly an object in the titrator of the present invention effectively to add to the generated electrode potential a supplementary electrical potential of progressively decreasing effect, to produce a series of false end point arrival signals with corresponding hesitations in delivery, before the actual predetermined end point potential is reached.

Another object of the invention is to apply the effective supplementary potential and the generated electrode potential to the input of an electrical control means adjustably responsive to an input of predetermined level, whereby said means will be responsive to the resultant effect of the electrode potential and the supplementary potential. The output of the electrical control means will then give a series of false end point arrival indications which can be used to control the stepwise delivery of titrating solution, and to control by the same token the stepwise, co-varying generated potential.

A further objective of the invention is to provide such electrical control means in the form of a combined potentiometer and null-sensing amplifier. The adjustable potentiometer contact is preset to supply a voltage equal and opposite to the desired end point electrode potential. The preset potentiometer voltage is then opposed to the combined instantaneous electrode potential and effective supplementary potential, and the algebraic sum thereof is applied to the input of the null-sensing amplifier section. As the changing electrode potential approaches the desired end point, its own value plus that of the effective supplementary potential, finally balances the preset potentiometer value, and delivery is momentarily halted as a null is falsely sensed by the amplifier. Successive diminishing increments of titrant then alternate with a succession of false null responses. The supplementary potential value decays step wise finally to zero, and the electrode potential, then having arrived at the desired value, is in balance with the preset potentiometer voltage. The titration, accordingly, has been accurately completed.

Another object of the invention is to employ as the source of the controlled supplementary potential a resistance-capacitance circuit which may be charged to an adjustable level of effective potential. Upon arrival at a false end point, a contact in the resistance-capacitance circuit may be opened to permit decay of the stored charge. After a small interval of time required for the system to sense and respond to the removal of the false null condition, the contact is again closed, and the circuit begins to recharge exponentially. The charging intervals are associated with delivery of titrating fluid and the discharging intervals associated with non-delivery. The potential to which the circuit can be charged during each successive delivery increment becomes progressively smaller and finally reaches zero, as the combined effect of the advancing electrode potential and effective supplementary potential each time adds up to the desired end point value.

It is another object of this invention to provide a resistance-capacitance network having a minimum number of elements, and in which the control for adjusting the initial supplementary voltage level will also favorably affect the final increment size, to produce smaller final increments at high supplementary voltage settings than at low voltage settings. It is also an object of the invention to provide such a resistance-capacitance network presenting a high impedance to the charging source so as not to affect the stability of the latter by variable loading.

The automatic titrator exemplifying the invention is extremely versatile, it being an object of the invention to provide a titrator the circuits of which are adaptable automatically to titrate acids or bases, or oxidizing or reducing samples, etc., merely by the change in setting of a switch.

A further object is to provide an automatic titrator which can function as a pH meter or an accurate millivoltmeter or electrometer of extremely high input impedance.

Another object is to provide a generally useful adjustable index means in connection with the indicating scales of pH meters, which adjustable means directly provides a reading of the asymmetry potential of glass electrode combinations.

Another object is to provide a signal light which during automatic titration will flash on and off in step with the incremental delivery of the titrant and which will indicate the completion of the titration by assuming a constant condition, e. g., by remaining illuminated. A further object is to provide a pH- or voltage-indicating device in which the changing of such a light from energized to unenergized condition or vice versa upon turning of a scale-carrying means will indicate on the scale the existing pH or voltage.

Another object is to employ a relay for actuating an electromagnetic valve controlling the flow of titrant together with a circuit in which this relay is thrown oppositely in titration of acids and bases, for example. Thus, in one instance the energization of the relay will be effective in delivering the titrant, the delivery stopping when the relay is not energized, and in another instance (as in titrating a base) the relay may be unenergized during titrant delivery and energized when no titrant is being delivered.

It is an object of the invention to provide an automatic titrator in which a plurality of delivery units, each set up to perform a separate titration, can be selectively connected to a common indicator unit or master unit. Further objects reside in the manner of orienting such delivery units and such a master unit and the manner of supporting the delivery units from the master unit.

A further object is to provide an automatic titrator which is automatically set into operation when the electrode pair is submerged. In this connection, it is an object to provide a liftable platform for a beaker or other sample-solution-container, this platform being raisable to submerge the electrode pair, this act of raising starting the automatic titration.

Further objects and advantages of the invention will be evident to those skilled in the art from the following description of an exemplary embodiment.

Referring to the drawings.

Figures 1, 1A, 2:
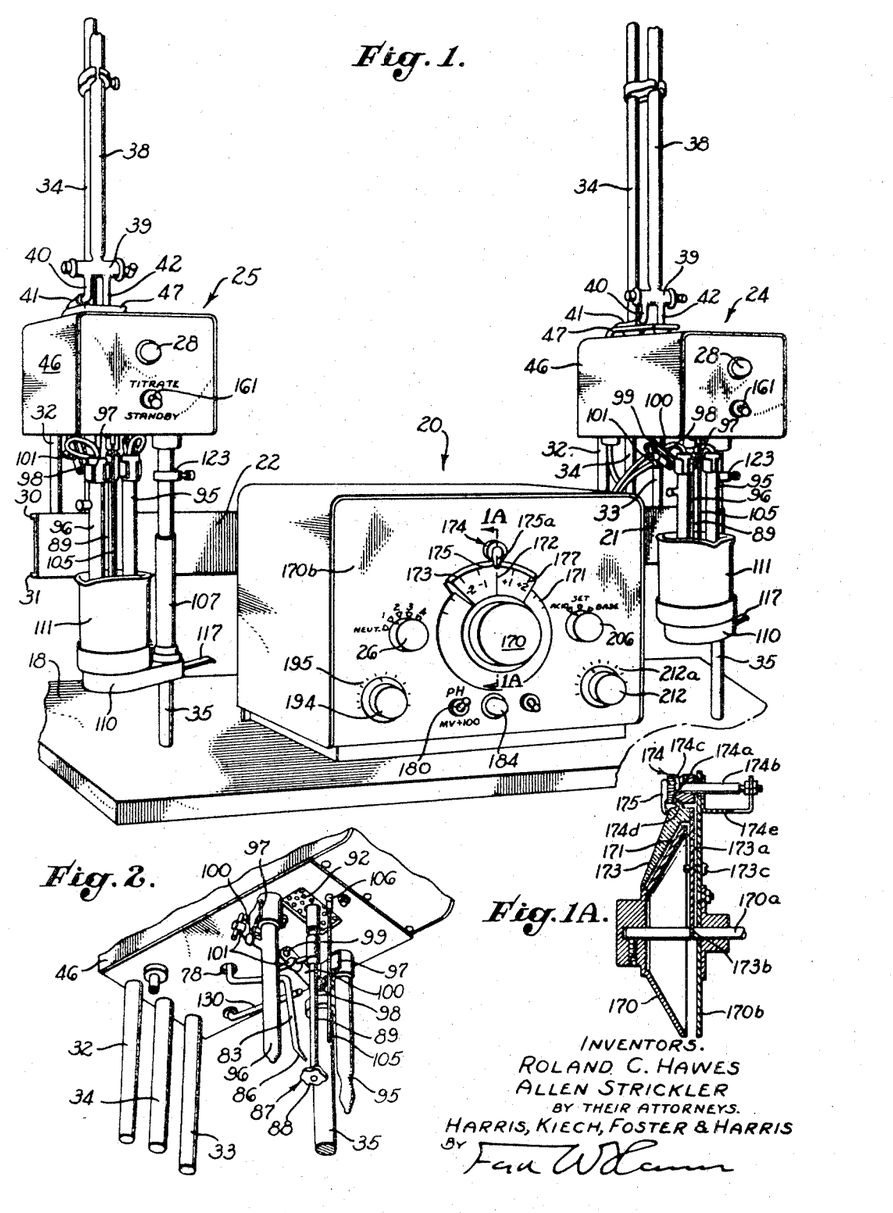
Fig. 1 is a perspective view of a master unit and two delivery units.
Fig. 1A is a fragmentary sectional view taken along the line 1A—1A of Fig. 1.
Fig. 2 is a fragmentary, perspective view looking upwardly from a position below one of the delivery units.

Referring particularly to Fig. 1, the laboratory-type automatic titrator is shown as resting on a table 18 and as including a single master unit 20 having rightwardly and leftwardly extending arms 21 and 22 respectively positioning delivery units 24 and 25. These delivery units are selectively connectible to the master unit 20 by turning a selector switch 26 from its neutral position to its first and second positions. A signal light 28 on the face of each delivery unit indicates or confirms the particular delivery unit being used. Up to four delivery units can be employed if the arms 21 and 22 are extended, two delivery units being positioned by each arm, the selector switch 26 connecting the remaining two units in its third and fourth positions.

Each delivery unit 24, 25 is readily removable from its arms 21, 22. For example, the arm 22 may provide an upper flange 30 and a lower flange 31 both drilled with vertically aligned openings to slidably receive posts 32 and 33 of a delivery unit. A third post 34 depends through a corresponding opening of the upper flange 30 but provides a lower end resting upon the flange 31 to support the delivery unit at least partially. Further support of a rigidifying nature is provided by a forward post 35 which depends from each delivery unit and provides a lower end resting upon the table 18. By this construction each delivery unit is rigidly positioned but can be bodily lifted from the vicinity of the master unit 20.

Each post 34 extends upwardly a substantial distance beyond the main structure of the delivery unit 24, providing a support for a conventional burette 38 which is preferably of the self-zeroing type, refilled after each use from a supply reservoir not shown in Fig. 1. This burette is a standard commercial type and provides a conventional stopcock 39 which selectively connects the burette to a refill port 40 (to which a rubber tube 41 may be conventionally connected) or to a connection 42. The connection 42 is connected by a rubber tube 43 (Fig. 3) to the intake neck 44 of an electromagnetic control valve 45 disposed, along with other equipment to be described, in a suitable housing 46. The connection 42 extends through and is sealed by a grommet with respect to a dished overflow member 47 supported at the rear of the housing 46. This overflow member receives any titrant which may overflow or leak from the burette 38 or its stopcock 39, conducting such titrant to the rear of the housing 46 and preventing such titrant from entering or collecting upon the housing 46.

The valve 45 preferably includes a valve body 50 clamped between a stationary jaw 51 (Fig. 6) carried by a bracket 52 and a movable jaw 53 secured by a rotatable connection to the inner end of a screw 54 threadedly received by a tab 55 of the bracket 52. The screw 54 carries a knurled head which when turned advances the movable jaw 53 toward the stationary jaw 51 to clamp the valve body 50 therebetween. The jaws 51 and 53 have cut-away portions to receive the neck 44 and a discharge connection 56, both preferably integral with the valve body 50.

One end of the valve body 50 provides an outwardly facing annular groove 57 (Fig. 7) formed around a central neck 58 having an end face 59 disposed a slight distance inwardly of an end face 60 of the valve body 50. A diaphragm 61 of flexible material relatively inert to the titrants to be used, typically a diaphragm of pure gum rubber, is stretched across the end face 60, being held in place by an elastic ring 62 lodging in an annular depression 63 of the valve body 50 to maintain the diaphragm in place.

Figures 3, 4, 5, 6, 7:
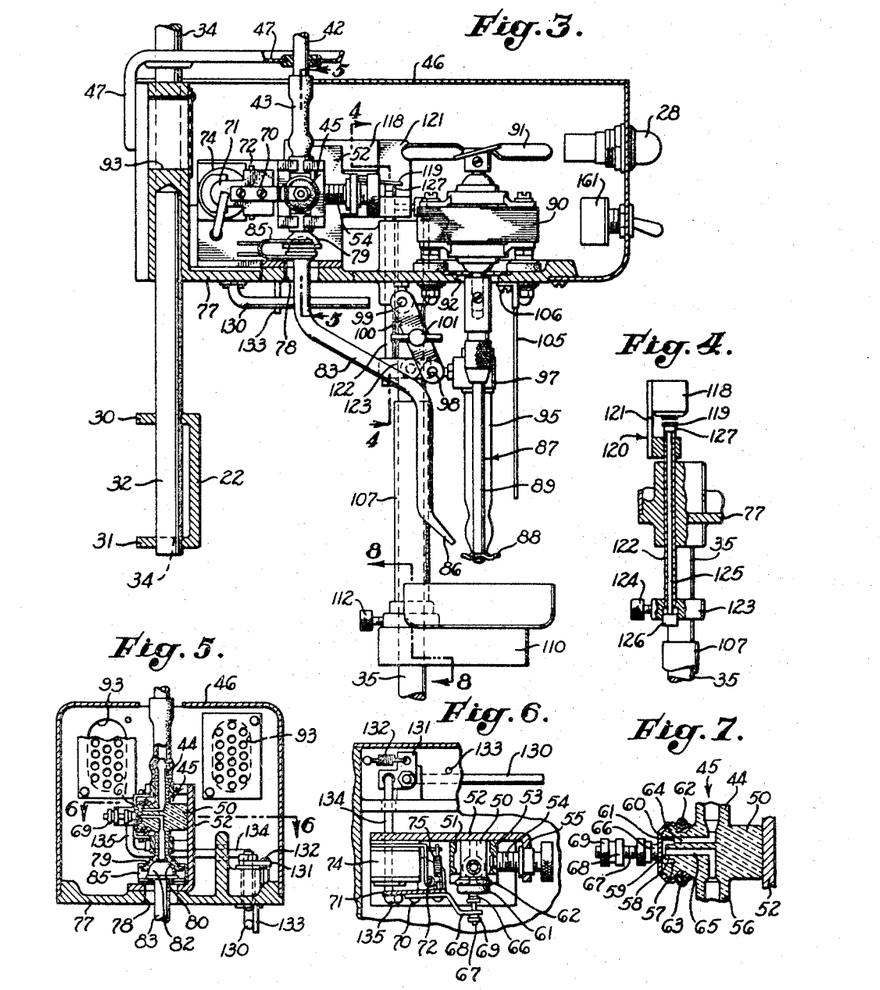
Fig. 3 is a vertical sectional view through one of the delivery units.
Fig. 4 is a sectional view taken along the line 4—4 of Fig. 3.
Fig. 5 is a sectional view taken along the line 5—5 of Fig. 3.
Fig. 6 is a sectional view taken along the line 6—6 of Fig. 5.
Fig. 7 is an enlarged sectional view of the valve shown in Fig. 5.

A small entrance passage 64 communicates between the interior of the intake neck 44 and the annular groove 57, preferably at the extreme upper end of this annular groove to permit any air bubbles trapped in or below the valve to escape upwardly through the titrant and out of the burette. An exit passage 65 extends from the end face 59 of the central neck 58 to the interior of the discharge connection 56.

The taut diaphragm 61 closes the annular groove 57 and provides an inner surface normally spaced a minute distance from the end face 59, in which condition titrant can flow through the entrance and exit passages 64 and 65 with merely a minute amount of the titrant remaining in the annular groove 57, thus facilitating flushing upon change in titrants and minimizing any titrant loss during such change. To close the valve it is necessary merely to exert a small inward force on the center of the diaphragm 61 to force this diaphragm into sealing engagement with the end face 59 of the central neck 58. This small pressure is applied by an actuator pad 66 carried at the end of an adjustable screw 67 threaded through an actuator arm 68 and locked in position by a lock nut 69. The actuator arm is adjustably mounted by screws 70 (Fig. 6) to an armature member 71 rocking on a pivot pin 72, the armature member being attracted by an electromagnet 74. A spring 75 urges the actuator pad 66 into valve-closing relationship with the diaphragm 61. Energization of the electromagnet 74 pivots the armature member 71 against the action of the spring 75 to draw the actuator pad 66 away from the diaphragm 61 and thus open the valve.

The bracket 52 provides a lower member secured to a base 77 of the housing 46 and having an opening aligned with an opening 78 of this base at a position immediately below a flanged enlargement 79 of the discharge connection 56 (Fig. 5). This flanged connection provides a hemispherical inner surface 80 forming a ground fit with a flanged hemispherical head 82 of a titrant discharge tube 83. The hemispherical head 82 turns in contact with the hemispherical inner surface 80 to permit the titrant discharge tube 83 to be adjusted in a universal manner through a generous angle. The enlargement 79 and the hemispherical head 82 are detachably connected by suitable conventional means permitting such relative movement, as by a spring-loaded clamp 85 with bifurcated ends respectively engaging and moving toward each other the flanges of the enlargement 79 and the hemispherical head 82.

As best shown in Figs. 2 and 3, the titrant discharge tube 83 is laterally offset to extend downwardly to a relatively sharp tip 86 preferably angled forwardly and adjustably located relative to a stirrer 87 including a disc 88 mounted on a shaft 89. The disc may be deformed in a radial pattern to provide a sinuous periphery aiding the stirring operation. The offset nature of the titrant discharge tube 83 together with the ball-and-socket connection with the valve permits a substantial degree of adjustment between the tip 86 and the disc 88. The stirrer 87 is driven by a small motor 90 which carries a fan 91 drawing a stream of air through a screened opening 92 of the housing 46, discharging this air rearwardly of the housing through one or more screened openings 93.

Mounted for limited universal movement below the housing 46 is an electrode pair exemplified as a conventional glass electrode 95 and a conventional calomel or other reference electrode 96. Each electrode is carried by a spring clip 97 having a ball connection 98. A similar ball connection 99 for each electrode depends from the base 77. The ball connections for each electrode are interconnected by a pair of arms 100 providing ball-encircling arcuate cavities at each end and being adjustably clampable to the balls by tightening a screw 101 which draws the arms together in a central location. With a proper degree of clamping action, each clip 97 is universally mounted for lateral movement, in any direction, vertical movement or angular movement, permitting the electrodes 95 and 96 to be placed in any angular relationship, at any spaced position and at any elevation relative to the stirrer 87 and its disc 88.

It is usually desirable to ground the test solution. This is accomplished by a ground wire 105 extending downwardly in the vicinity of the stirrer 87 and held in place by a screw 106 threaded into the base 77. The ground wire is thereby made electrically continuous with the delivery unit base, the latter being electrically connected to the master unit frame which is in turn connected to an external earthed point.

Figure 8:
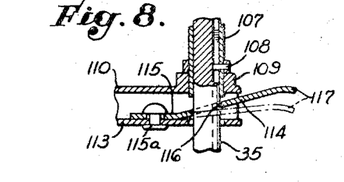
Fig. 8 is a fragmentary sectional view taken along the line 8—8 of Fig. 3.

The forward post 35 of each delivery unit is surrounded by a sleeve 107 which can slide thereon to be adjustable in vertical position, a pin 108 preventing turning of the sleeve and extending into a guideway of the post 35. Secured to the sleeve 107 is an enlargement 109 of a platform 110 adapted to carry a beaker 111 or other container for the sample solution to be titrated. The platform 110 can rotate relative to the sleeve 107, being clampable thereto in a selected position by tightening a screw 112 (Fig. 3). The platform 110 is hollow, being closed by a lower plate 113 (Fig. 8).

Suitable clamping means is provided to clamp the sleeve 107 and platform 110 in raised position, once the beaker 111 has been positioned on the platform and raised to such position that the lower ends of the electrodes 95, 96, the tip 86, the stirring disc 88 and the ground wire 105 are submerged in the sample to be titrated. The preferred clamping means includes a clamping member 114 formed of spring material and providing an inner end 115 loosely clamped to the lower plate 113 as by a rivet 115a to permit a limited degree of lateral movement sufficient to center an opening 116 of the clamping member below the sleeve 107. This opening 116 is of a diameter only slightly larger than the post 35, permitting free sliding along the post when the clamping member 114 is depressed to its dotted line position (Fig. 8) upon pressure being applied to an outer end 117 of the clamping member. However, the clamping member 114 is internally stressed to be biased toward its full line position, at which time diagonally-opposed edges of the clamping member at the periphery of the opening 116 engage the periphery of the post 35 in clamping relationship. This engagement takes place when the clamping member 114 swings sufficiently out of a plane perpendicular to the axis of the post 35.

Means is provided for automatically starting the motor 90 and its stirrer 87, and also for initiating the titrating action, upon raising of the platform 110. This means is best shown in Figs. 3 and 4 and includes a normally-open limit switch 118 closable upon slight upward movement of an actuator arm 119. This switch is mounted on a vertically-adjustable assembly 120 including a frame 121 connected to a tube 122 which in turn is connected to a collar 123 slidable on the post 35. The assembly 120 is clamped in adjustable vertical position by tightening a knurled screw 124 threaded through the collar 123 into engagement with the post 35. Slidable in the tube 122 is a rod 125 having an actuator button 126 depending a slight distance below the collar 123 to be engaged by the top of the rising sleeve 107. This pushes the rod 125 upwardly so that a head 127 thereof raises the actuator arm 119 to close the switch 118. The adjustment is such as to close this switch at various raised positions of the platform 110 to accommodate beakers of different height or solutions of different depth. The switch 118 is connected to start the titration and to start the stirrer motor 90.

Means is preferably provided for manual actuation of the valve 45 from a position outside the housing 46. As the valve 45 is normally closed, this means preferably includes a manual means for opening the valve. The preferred arrangement is best shown in Figs. 3, 5 and 6, and includes an arm 130 having an upwardly extending portion traversing the base 77 and carrying a bell crank 131. A spring 132 normally holds the arm 130 resiliently in engagement with a stop pin 133. The bell crank 131 is connected to a rod 134 having a bent portion 135 lying in front of the armature member 71, the rod 134 sliding in an opening of the bracket 52. By manually pressing the end of the arm 130 in a direction away from the stop pin 133, the armature member 71 is drawn inwardly to open the valve 45. This manual actuation is very sensitive and is of value in accurately adjusting the initial amount of titrant if the burette is not of the automatic zeroing type. It is also of value in testing the operation of the valve 45, in running titration curves, etc.

It is desirable that the titrator be capable of titrating to a selected end point either acid or alkaline sample solutions, or samples of oxidizing or reducing agents. It is also desirable that the instrument be usable as a pH meter or as an accurate millivoltmeter, for example, in the measurement of oxidation-reduction potentials.

The hereinafter described circuit makes possible these different functions, albeit they present numerous problems. A problem generic to most accurate titrations to an end point is the characteristic extremely high rate of change of the developed electrode potential with added titrating solution, as the end point is approached. The present invention provides a means for grading the delivery as the end point is approached to prevent overshooting thereof. This is accomplished by making the valve 45 operate intermittently to deliver progressively decreasing amounts of the titrant as the end point is reached. This is accomplished by use of the voltage-supplement supplying circuit or "anticipation" circuit to be described or by other pulsing means.

Another problem arises from the fact that a selected end point must be approached in opposite directions when titrating acids and bases, for example. Expressed differently, the developed electrode potential during the course of titration is in some cases a positively increasing function and in others a negatively increasing function. This problem presents certain difficulties of design if increased circuit complexity and cost are to be avoided. It requires also that the polarity of the supplementary or anticipation voltage must be reversed when changing from one type of titration to another.

Figure 9:
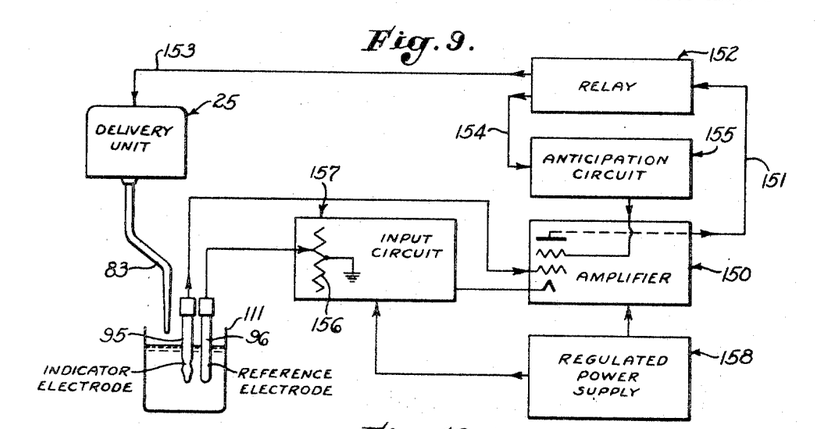
Fig. 9 is a block diagram showing the general interconnection of the circuit elements.
Figure 11:
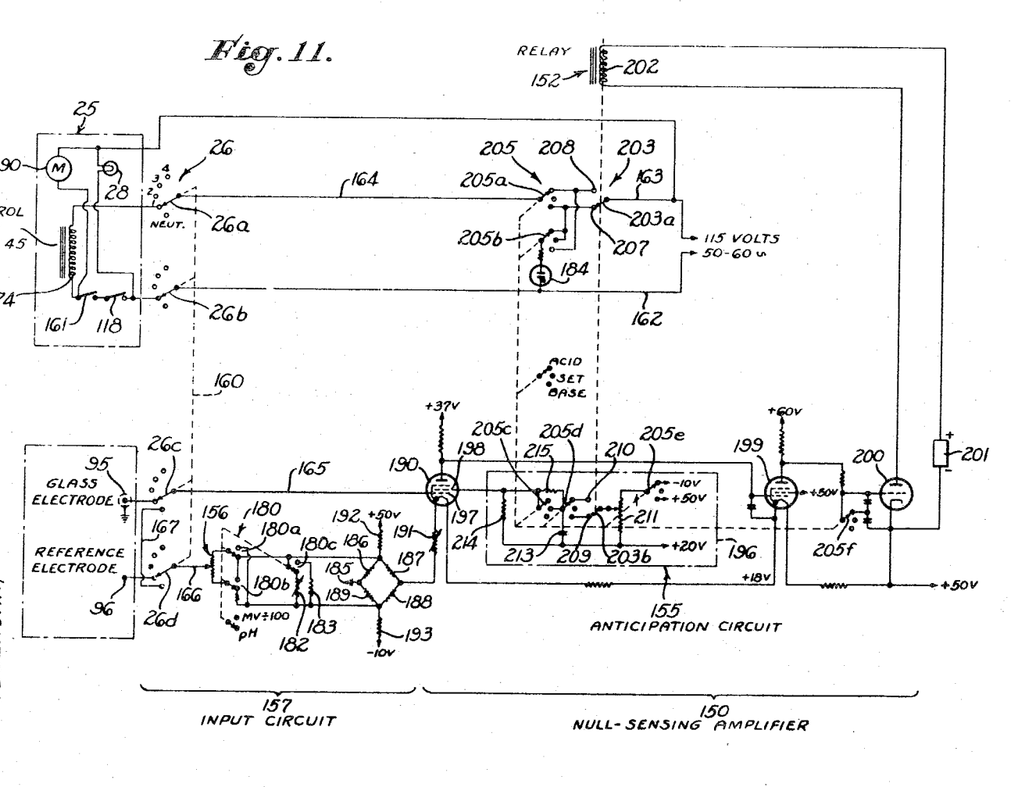
Fig. 11 is a simplified wiring diagram of the automatic titrator.

In the exemplified embodiment, these problems are solved by use of circuits of the type shown in Figs. 9 and 11 which exemplify the invention as employing a null-sensing amplifier 150 having an output means connected by a circuit 151 to a relay 152 serving a dual purpose. In the first place, this relay energizes, through a circuit 153, the electromagnetically-operated valve 45 of a delivery unit, e. g., the delivery unit 25. In the second place, this relay controls by way of connection 154 (Fig. 9) a supplementary-voltage controlling or "anticipation" circuit 155. The anticipation circuit in turn sends a signal to the input of the amplifier 150 as does also the electrode pair 95, 96. When using a null-sensing amplifier, the potential of the electrode pair is preferably connected in opposition to a set or reference potential, obtainable for example from a potentiometer 156 forming a part of an input circuit 157. This input circuit, as well as the amplifier 150, receives power from a regulated power supply 158, suggested diagrammatically in Fig. 9 and omitted from Fig. 11 for purpose of clarity and in favor of potential indications at various points in the circuit, the indicated potentials being with reference to a circuit ground.

Referring first to the simplified block diagram of Fig. 9, the potentiometer 156 may be initially set to the electrochemical potential at the desired end point, this potential being opposed to the changing potential of the electrode pair to apply a net potential to the input means of the amplifier 150. At the start of a titration this net potential is large, and the amplifier 150 is triggered either at its high, saturated output current level or at zero output, depending on the polarity of the input. In either case, by switching and suitable use of the contacts on the relay 152 the electromagnetic valve 45 is initially constantly open to deliver a stream of the titrant to the solution being titrated, the stirrer being in continuous operation to effect rapid equilibrium. As the potential of the electrode pair changes toward the potential at which the potentiometer 156 is set, the signal from the input circuit 157 decreases in absolute magnitude. In the absence of the anticipation circuit, the amplifier 150 would close the valve 45 when a null input condition was reached. This, however, would result in serious overshooting of the end point.

To overcome this defect, the anticipation circuit initially supplies to the input of the amplifier 150 an effective potential, of suitable sign, additive in effect to the net potential from the input circuit 157, causing the amplifier prematurely to sense a null condition. If, as is preferred, this amplifier is of the high-gain, overdriven type with its output tube driven to saturation on a very small differential of input signal, the output will very suddenly drop to zero or rise to saturation level (depending on the type of titration), causing actuation of the relay 152 to close the valve 45. However, such actuation of the relay modifies the anticipation circuit 155 by way of the connection 154 to cause decay or decrease of the anticipation signal and thus permit the input of the amplifier means to depart from its previous null condition, whereupon the amplifier 150 quickly senses that such condition was a false one and operates the relay 152 to reopen the valve 45. At the same time the relay acts by way of the connection 154 again to increase the signal from the anticipation circuit 155 to produce another false null condition at the input of the amplifier 150. In the meantime, however, the additional titrant delivered to the test solution has changed the potential of the electrode pair to a value closer to the potential of the potentiometer 156 so that the later applied anticipation voltage need not be as high to create the false null at the amplifier input. This sequence is repeated, the anticipation circuit applying progressively smaller levels of signal, until the potential of the electrode pair balances that of the potentiometer in which condition a true null is sensed at the input of the amplifier to cause the relay 152 permanently to close the valve 45 and indicate the end of the titration.

Refer now to Fig. 11. This simplified wiring diagram shows only one of the delivery units, e. g., the unit 25, connected to the first position of the selector switch 26 shown as including sections 26a—26d ganged together as suggested by the dotted line 160. When the selector switch is shifted to the second, third or fourth positions, it will connect its several sections to additional delivery units identical with those heretofore described.

As shown, the section 26b is connected to the electromagnet 74 through a standby switch 161 on the front of the corresponding delivery unit, the circuit being completed through the limit switch 118, which is closed by lifting the assembly 120 and the beaker 111, and through a conductor 162 to one side of a conventional A. C. circuit. The other side of this circuit, represented by a conductor 163, is connected through a double switching means to be described through a conductor 164 to the switch section 26a. The stirrer motor 90 and the signal light 28 are also connected to the A. C. circuit as shown.

The switch section 26c is shown in a position to receive the potential of the glass electrode 95, being connected to a conductor 165. The switch section 26d is shown in a position to receive the potential of the reference electrode 96, being connected through a conductor 166 to the potentiometer 156. When the selector switch 26 is in its neutral position, the electrodes 95 and 96 are disconnected from the circuit, and the sections 26c and 26d are effectively short-circuited by a conductor 167.

The potentiometer 156 is preferably of the slide wire drum type, preferably an elongated, close-wound helix of resistance wire bent and secured circumferentially upon a drum rotatable through an angle of about 330° by a large knob 170 (Fig. 1) on the front of the master unit 20. The potentiometer 156 is of conventional design and provides a stationary contact connected to the conductor 166.

The large knob 170 (Figs. 1 and 1A) is fixed to a shaft 170a extending through a panel 170b of the master unit to the potentiometer drum. This knob 170 carries a scale 171 calibrated in pH units and moving opposite a zero line 172 of a movable index member 173 formed of transparent material. This index member is arcuately adjustable about the axis of the shaft 170a, as by being attached to a plate 173a having a saddle 173b at its lower end riding on the periphery of the shaft 170a and limited in its arcuate motion by engagement with screw means 173c.

The index member 173 is frictionally held in a set position by a retaining means 174, shown as including a knurled adjusting wheel 174a rotatable on a shaft 174b and having a peripheral groove 174c in which rides an arcuate bead 174d of the index member 173. The shaft 174b is biased to press the wheel 174a against the bead 174d, as by fixing the rear end of the shaft to the rear leg of a U-shaped spring member 174e, the front leg being secured to the panel 170b. The forward end of the shaft 174b carries a fixed index member or pointer 175 with a central zero or reference line 175a. The index member 173 is movable relative to the pointer 175 by turning the wheel 174a. The movable index member 173 carries a scale 177 calibrated leftward minus two pH units and calibrated rightward plus two pH units.

To reverse the polarity on the winding of the potentiometer 156, and to perform other functions, the invention includes a toggle switch 180 having switch sections 180a and 180b serving as a straightforward reversing switch and having a switch section 180c alternately paralleling the winding of the potentiometer 156 by a temperature-compensating, variable resistance 182 and a fixed resistance 183 when the selector switch 180 is respectively in its "pH" and its "MV÷100" positions. The circuit arrangement is such that when the toggle switch 180, positioned on the face of the master unit 20, is in its "pH" position and an "Acid-Set-Base" switch 206, likewise on the master unit, is in "Set" position, direct readings of pH of the solution can be obtained by rotating the knob 170 until a null condition is reached, indicated by actuation of the relay 152 or by a signal light 184 on the face of the master unit 20 and connected as will be later described. When the toggle switch 180 is thrown to the "MV÷100" position, it will change the circuit to permit a direct indication of millivolts applied to the input means, the reading being obtainable from the scale 171 at the null condition. Thus, a reading of 6 on scale 171 against the zero line 172 represents an input of 600 millivolts. To accomplish this, the switching operation changes the scale calibration, reverses the polarity of the potentiometer drum and changes the equivalent ground point of the drum.

When presetting the instrument for titration, the toggle switch 180 is similarly selectively positioned, depending on whether titration is to a pH or desired millivolt end point, the desired end point being set by suitable positioning of the scale 171 against the zero line 172.

The actual circuit ground is isolated from the instrument frame and the external earthed connection. It is indicated at 185 at one junction of a network including resistors 186, 187, 188 and 189, this network being energized partly by the current from the filament string, which feeds an input tube 190 and the other amplifier tubes by way of a zero-control, variable resistor 191.

Additionally, the network is in part energized through a resistor 192 connected to +50 volt point of the power supply 158. A common return is made to the −10 volt point of the power supply 158 via a resistor 193. This network aids in adjusting the scale match of the temperature-compensating, variable resistance 182 and in increasing its linearity. In this connection, the temperature-compensating, variable resistance 182 is adjustable by a knob 194 on the face of the master unit 20 and moving opposite a scale 195 calibrated in degrees of temperature. The knob 194 is turned to the existing temperature of the sample solution, and its connected variable resistance 182 serves automatically to compensate the potentiometer for the change occurring in the potential vs. pH function of the electrode pair as temperature is altered. This it accomplishes by suitably modifying the current in the potentiometer 156, so as to make the scale 171 accurately direct-reading in pH regardless of temperature without recourse to correction by calculation. However, it is desirable that this temperature compensation be made only when the toggle switch 180 is in the "pH" position, this function being performed by the switch section 180c.

The input tube 190 of the amplifier 150 provides an amplifier input means to which is connected the input circuit 157 and the anticipation circuit 155, the latter being shown within dotted lines 196 of Fig. 11. While the voltage from both sources can be applied to a single grid, we prefer to apply these to separate grids, as exemplified in electron tube 190, shown as a pentode with a control grid 197 connected to the conductor 165 and a screen grid 198 connected to the anticipation circuit 155. A signal applied to the screen grid 198 is only a small fraction as effective as if this signal were applied to the control grid 197, hence voltage changes applied to the screen grid are equivalent in effect upon the circuit to smaller changes upon the control grid. Isolation of the signals upon separate grids is preferred as a matter of convenience in design.

The null-sensing amplifier 150 is rather conventional in design, employing an intermediate tube 199 feeding an output tube 200 with tube elements connected as shown in Fig. 11. The output tube 200 is connected through a high-voltage source of D. C. 201 to the winding of the relay 152, this winding being indicated by the numeral 202. The over-all function of the null-sensing amplifier in our preferred arrangement is to energize the winding 202 of the relay when the amplifier input receives a minute unbalance signal in one direction and to de-energize this winding when the amplifier input receives a minute unbalance signal in the opposite direction. With the amplifier shown, the output tube 200 operates at saturation if the input receives more than a minute positive unbalance signal, while if the input unbalance signal becomes more than minutely negative, the output tube is driven abruptly beyond cutoff, and output current to the relay becomes effectively zero. The amplifier as thus constituted provides a highly sensitive and positively acting null-sensing device with adequate output power for operating a relay or equivalent element.

The function of the anticipation circuit 155 is to add to the input means of the tube 190 a signal additive in effect to the signal applied to the control grid 197, causing the amplifier prematurely to respond to a null condition. The anticipation circuit 155 is then caused, by way of the relay 152, to reduce its potential so that the input signal backs down from the level which caused null response. Accordingly, the amplifier output presently reverts to its former state and restores the contacts of the relay 152 to their former position. Accordingly, the anticipation voltage again changes toward the null-producing condition. The anticipation circuit is correspondingly a means of alternately applying and removing a supplementary signal to the amplifier input and desirably supplies electrical increments of decreasing magnitude as the end point is reached, by suitable circuit design, as hereinafter explained.

The preferred anticipation circuit is a time-delay or RC circuit with elements switched by a relay switch 203 (to effect charging and discharging of the RC circuit) and by a selector switch 205. The latter is actuated by a knob 206 on the front of the master unit to be moved between "Acid," "Set" and "Base" positions. It includes ganged switch sections 205a–205f each assuming any one of the three positions suggested in Fig. 11. The relay switch 203 includes two switch sections 203a and 203b respectively switching the valve-control circuit and the anticipation circuit. The section 203a includes a normally-closed contact 207 and a normally-open contact 208. Similarly, the section 203b includes a normally-closed contact 209 and a normally-open contact 210, the contacts 207 and 209 being closed when the relay winding 202 is not energized.

The anticipation circuit 155 should be capable of producing electric increments of opposite polarity when titrating acids and alkalis or, correspondingly, when titrating oxidizing or reducing agents. To accomplish this, the switch section 205e changes the polarity of the potential applied to an anticipation control potentiometer 211 adjustable by a knob 212 on the face of the master unit 20. When the selector switch 205 is in the "Acid" position, the switch section 205e applies a −10 volt potential to the top of the winding of the potentiometer 211, the lower terminal being connected to a potential of +20 volts. When the switch section 205e is in the "Base" position, the upper end of the potentiometer winding is connected to a potential of +50 volts. Correspondingly, the upper end of the potentiometer winding can be made either negative or positive relative to the lower end, connected to +20 volts, and the movable contact of the potentiometer controlled by the knob 212, can pick out any desired fraction of the total potential applied to the potentiometer winding 211. This movable contact can be connected through the switch section 203b of the relay either to the normally-closed contact 209 or to the normally-open contact 210.

When the selector switch 205 is in the "Acid" position shown, the charging potential from the potentiometer 211 is connected across a condenser 213 each time the relay 152 is energized. With the selector switch section 205d in the "Base" position, the condenser 213 is charged each time the relay is de-energized.

The RC circuit includes, in addition to the condenser 213, two resistors 214 and 215 providing a common terminal connected to the screen grid 198. The remaining terminal of the resistor 214 is connected to +20 volts, and the remaining terminal of the resistor 215 is connected to the arm of the switch section 205d. With the selector switch 205 in the "Acid" or "Base" position, the condenser 213 discharges through the resistors 214 and 215 in series. With the selector switch in the "Set" position, the switch section 205c shorts out the resistor 215 for more rapid amplifier response when the instrument is used as a pH meter or voltage measuring device. In some instances, the resistor 215 and the switch section 205c can be eliminated, in which event a somewhat larger condenser 213 would usually be employed.

The anticipation control potentiometer 211 may be quite high in resistance, typically 5 megohms. Its impedance is preferably sufficiently high that variations in the setting will strongly affect the charging time constant of the circuit. When the movable contact of this potentiometer 211 is in its uppermost position, i. e., at maximum anticipation setting, the potentiometer contributes no impedance affecting the time constant. At a more central position, it presents, say, a 1¼ megohm impedance to the circuit to be charged. The very desirable effect is thus obtained that at high anticipation settings the rapid, incipient charging of the circuit produces smaller final delivery increments than is the case for low values of anticipation setting. Additionally, the relatively high impedance of the anticipation control potentiometer 211 results in a negligible drain of current from the regulated power supply and does not reflect any effect upon the latter as the anticipation circuit is opened or closed.

Figure 10:
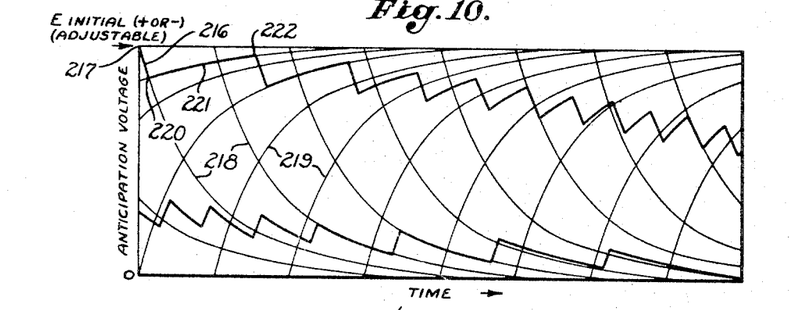
Fig. 10 shows diagrammatically the way in which the anticipation voltage varies.

While Fig. 10 exemplifies somewhat of an idealized anticipation voltage behavior curve, suggesting substantially equal time constants, it is preferable that there be a ratio of at least 10 to 1 for discharge time constant to charge time constant. This will be accomplished if the resistors 214 and 215 are, for example, 2-megohm and 10-megohm resistors respectively. The ratio of their sum, while connected in series, to the effective impedance of 1¼ megohms previously mentioned concerning the anticipation control potentiometer 211 is desirably high in this respect and is advantageous as compared to a system with equal time constants in providing short delivery increments near the end point while preventing excessively short periods of non-delivery near the beginning of the action of the anticipation circuit.

The switch sections 205a switches the valve-control circuit to be selectively energizable upon energizing or de-energizing of the relay 152. Thus, when the selector switch 205 is in the "Acid" position, the valve-control circuit is energized in step with the energization of the relay 152. When this switch is in the "Base" position, the valve-control circuit is energized during periods of de-energization of the relay 152. As will be subsequently apparent, the relay 152 is operated oppositely when titrating acids and bases, for example.

Remembering that the valve 45 is opened during periods of energization of the valve-control circuit and closed when this circuit is de-energized, it is desirable that the signal light 184 be illuminated during closed periods of the valve to produce a readily visible signal when the titration is complete and evidenced by the signal light remaining illuminated. This is accomplished by the switch section 205b. When the selector switch 205 is in the "Acid" position, the signal light 184 is illuminated each time the relay switch 203 assumes its no-current position shown in Fig. 11 whereby the signal light remains illuminated when the relay 152 is de-energized. When the selector switch 205 is in the "Base" position, the signal light 184 is energized in step with the relay 152.

In the "Set" position of the switch 205, as in the "Acid" position, the signal light 184 is illuminated when the relay is unenergized. The correspondence of the signal light behavior in this position with that in the "Acid" position is arbitrary. Correspondence with "Base" position behavior would serve equally well, the light merely serving as a null indicator when the instrument is used as a pH meter or voltage measuring device.

Preparatory to using the apparatus for automatic titration of the neutralization type, it should be standardized to determine the proper setting of the movable index member 173. With the glass and reference electrodes submerged in a buffer of known pH, with the toggle switch 180 thrown to the "pH" position, with the selector switch 205 thrown to the "Set" position and with the temperature-compensating knob 194 set to the temperature of the buffer, the knob 170 is turned until the indicator light 184 clicks on or off, depending on the direction of rotation, to indicate the balance point. The index member 173 is then moved until its zero line 172 is directly over the pH reading on the scale 171 corresponding to the pH of the buffer at the temperature of standardization. This automatically corrects for asymmetry potential of the electrode pair. The degree of such correction can be read directly in pH units from the scale 177 referred to the pointer 175, a valuable aid in later resetting the movable index member after other delivery units have been used without the necessity of restandardizing. Another valuable and novel advantage of this arrangement is that the pH correction reading thus observed is also the actual asymmetry potential value, expressed in pH units, of the electrode pair. In this way a continuous and convenient check upon the condition of the electrodes is available inasmuch as the appearance of large asymmetry potentials is often indicative of a faulty or deteriorating electrode. This feature is of value in many types of pH meters and related devices.

Accuracy in indicated asymmetry potential is best assured by occasional check and adjustment of amplifier zero as follows: Short amplifier input by turning the selector switch 26 to "Neutral." Align the zero line 172 of the scale 177 with the pointer 175. Align with the zero line 172 that value of pH on the scale 171 at which the glass electrode is designed ideally to generate zero volts in conjunction with the usual reference electrode. Adjust the amplifier zero control 191 (Fig. 11) to obtain a null indication as shown by the signal light 184.

To titrate automatically an alkaline sample with an acid titrant, the temperature-compensation control is set to the temperature of the sample solution and the desired pH end point is set opposite the previously-positioned zero line 172. The selector switch 205 is moved to the "Base" position. During the titration of an alkali, the potential of the electrode pair as observed at the amplifier input will change continuously in the positive direction to the end point. Consequently, the anticipation voltage must be of positive sign if a series of premature end points is to be sensed by the amplifier. When the selector switch 205 is set to the "Base" position, a positive potential will be applied to the anticipation circuit 155.

By adjustment of the anticipation control knob 212 to a suitable value on the associated arbitrary scale 212a, dependent on the nature of the titration to be performed and the proximity of the delivery tip 86 to the lower sensitive tip of the indicating electrode 95, a suitable pattern of anticipation behavior may be obtained. Thus, titrations with characteristic high slope of voltage change at the end point call for larger anticipation settings than those not so characterized. Also, close proximity of delivery tip to the indicating electrode calls for smaller anticipation setting. Excessively high settings are to be avoided because the numerous hesitations waste time and inadequate settings cause overshooting of the desired end point. Optimum settings are best determined in a trial run for all new titrations.

With the standby switch 161 of the particular delivery unit closed and with the selector switch 26 set to connect the master unit 20 to this particular delivery unit, the platform 110 and its beaker 111 are now raised until the top of the sleeve 107 contacts the actuator button 126 to close the switch 118, whereupon the titration automatically starts. The amplifier 150 will at this time be in an "off" condition to de-energize the relay 152 and energize the valve-control circuit to open the valve 45.

This valve will remain open until 90–95% of the required volume of titrant has been delivered, the stirrer 87 operating in the meantime to mix adequately the titrant with the solution and the potential of the electrode pair continuously rising toward the potential of the potentiometer 156 and advancing the control grid 197 in a positive direction. When this volume of titrant has been delivered, the combined electrode and anticipation potentials become more than large enough to balance the potentiometer voltage. The input unbalance signal exceeding a certain minute positive value, the amplifier is triggered, i. e., responds to a false null and assumes an "on" or conducting condition. The relay 152 is accordingly energized. The switch section 203a disconnects the contact 207 to de-energize and close the electromagnetic valve 45 and connects the contact 208 to illuminate the signal light 184. The switch section 203b opens the circuit connected to the contact 209 and moves to the now-unconnected contact 210, permitting the anticipation voltage previously applied to the screen grid 198 to decay at a rate determined by the product of the capacitance 213 and the series resistance of elements 214 and 215.

This decay of the anticipation voltage is suggested diagrammatically in Fig. 10 by the relatively short line 216. Fig. 10 is an idealized curve staggered in two sections for more compact presentation. Actually, the lower heavy-line curve represents the end portion of the top heavy-line curve and shows the course of anticipation voltage change as the end point is reached. In Fig. 10 the initial anticipation voltage is indicated by the numeral 217, anticipation voltages being shown as ordinates and time as abscissae. The background lines 218 are traces of characteristic decay curves of the RC network while the background lines 219 are traces of characteristic growth curves of this network.

As soon as the anticipation circuit voltage decays to some point 220, determined by amplifier response time and input differential required to reverse the amplifier, the amplifier 150 senses the falsity of the null and becomes non-conducting thus de-energizing the relay 152, opening the valve 45, de-energizing the signal light 184 and moving the switch section 203b to start recharge of the RC circuit. The anticipation voltage then rises along a line 221 of Fig. 10 to a point 222 determined by the advance meanwhile made in electrode potential, at which time the amplifier senses another null condition and becomes conducting to close the valve 45. It is thus seen that a lesser anticipation voltage suffices to effect this false null than the previous one. This cycle of events is usually repeated some five to twenty or more times before the titration is completed, the anticipation voltage being able to charge only to successively lower levels before its own effect, added to that of the rising potential from the electrode pair, each time combines to balance the potential at which the potentiometer 156 is set. Ultimately the anticipation voltage decays to zero, the electrode potentials finally equaling the potentiometer voltage setting, and the titration is accurately concluded. It will be apparent from Fig. 10 that the valve-open intervals become progressively shorter and the valve-closed intervals become progressively longer as the end of the titration is reached, thus grading the delivery of titrant until merely a fraction of a drop is dispensed during the last valve-open interval to bring the titration to the exact end point. The valve-closed intervals between the last increments of delivery are furthermore sufficiently long to permit complete sample mixing and equilibration of the system. The valve 45 then remains closed, and the constant illumination of the signal light 184 indicates to the operator the completion of the titration. The volume of titrant used can now be readily determined by reading the burette 38.

If the titration just completed is one of a similar series, the only operation required for each succeeding titration is refilling of the burette and replacement of the sample. When the new sample is raised into position, titration begins automatically. No further electrical adjustments are required. If different titrations employing a different titrant must also be run with some frequency, up to three separate additional delivery units are available, at a turn of the switch 26, for immediate use at any time.

When titrating an acid sample, the electrode potential will be falling, i. e., changing negatively, but setting of the selector switch 205 to the "Acid" position will cause the anticipation circuit 155 to deliver the required negative anticipation potential. The amplifier 150 is initially in a conducting condition, i. e., triggered "on," to energize the relay 152 during the initial part of the titration, but the selector switch 205 will then cause opening of the control valve 45 during the time that the amplifier is in a conducting state. Correspondingly, during intervals of non-delivery of the titrant, and also when the titration is completed, the amplifier is in a non-conducting state. As before, however, the indicator light 184 is illuminated during non-delivery and at the conclusion of the titration.

If titrations of oxidation-reduction type are to be performed, a delivery unit fitted with suitable electrodes is employed, e. g., platinum and calomel reference electrodes. The toggle switch 180 is thrown to the MV÷100 position. The proper position of the zero line 172 is determined as follows: The input of the amplifier is shorted by turning the selector switch 26 to "Neutral." The knob 170 is rotated until the indicator light 184 goes on or off. The scale 177 is now positioned to align the zero line 172 with zero on the scale 171. The desired titration end point is now set up by rotating the knob 170 to align the desired value with the zero line 172. The selector switch 26 is turned to the position corresponding to the delivery unit to be used. If the sample is an oxidizing agent, the "Acid-Set-Base" switch 206 is turned to "Acid"; if a reducing agent, the switch is turned to "Base." Circuit response to oxidizing samples in oxidation-reduction titrations is the same as to acid samples when neutralizations are performed. This type of titration generically includes all those which are characterized by negatively changing electrode potentials during the course of the titration. Correspondingly, reducing agents correspond to samples of base and belong to the generic group of titrations which show positively changing electrode potential during the course of the titration. Accordingly, all further manipulations in oxidation-reducing or other titrations are the same as those outlined in the neutralization titration procedure.

To use the instrument as a pH meter or as a voltage measuring device, for example, in measurement of oxidation-reduction potentials, the knob 206 on the master unit control panel is positioned to "Set." The instrument will now behave simply as an accurately calibrated null-type pH meter or voltmeter provided with a null-sensing amplifier and null-indicating means. As may be seen in Fig. 11, this is accomplished by the action of the switch 205, which in "Set" position completely discharges and renders inoperative the anticipation circuit and likewise renders inoperative the delivery control valve 45, so that the latter remains closed. Signal light 184 continues to function, indicating the null condition by going on or off, depending on the polarity of the minute unbalance signal at the input. The selector switch 26 is suitably positioned to correspond to the delivery unit in use, and the selector switch 180 is respectively positioned to the upper (pH) or lower (MV÷100) position. If pH is to be measured, the zero index line 172 should be set by a prior buffer standardization operation, as described earlier in connection with neutralization-type titrations, and the temperature-compensator control knob 194 set to the sample temperature. To measure millivolts, the zero line 172 is adjusted by shorting the amplifier input as described under the procedure for oxidation-reduction type titrations. The value of pH or millivolts may now be read by rotating the knob 170 until the signal light 184 just changes and observing the value on the scale 171 against the zero line 172. If the "Standby Titrate" switch 161 on the delivery unit is in "Titrate" position during the measuring operation, the stirrer is operative, but may optionally be made inoperative by throwing the switch to "Standby."

Availability of the instrument as a pH or millivolt meter is particularly useful in charting the titration curve. The controls are set as just described for pH or millivolt measurements, and the "Standby Titrate" switch is kept at "Titrate" to maintain stirring action, and the manual valve release lever 130 (Fig. 6) is used to release titrant from the burette into a characteristic titration sample. The manually added portions are made relatively large at first, then graded down to increments which may be as small as .05 or .02 ml. toward the equivalence point. Following each increment the burette is read, the pH or generated millivolt value determined as described, and the data so obtained plotted as pH or millivolts vs. volume added. Since the value of pH or millivolts at the midpoint of the "break," i. e., the vertical or near vertical portion of the curve typically corresponds to the "equivalent" point or end point, this is a convenient means of determining desired end point values not previously known from experience or by theoretical considerations.

Additional uses of the specific embodiment of our invention, related to the problem of titration, will be apparent. One of these is the control of the pH of bodies of solution inasmuch as the titrator is designed for addition of a reagent to a solution to bring and maintain the same to a desired pH value. Another is the problem of adjusting the pH of various media to desired values, for example, biological culture media. The titrator provides a means of performing this operation routinely and rapidly where manual adjustment of numerous samples would be tedious and very time consuming.

In specific titrations, for example, determination of the neutralization number of oils, the end point is characterized by very slow equilibration; that is, each drop added appears at first to have exceeded the end point, but slowly reacts with the sample so that more titrant is observed to be necessary. This makes for tedious time-consuming titrations when performed manually. Such titrations are not uncommonly one-half hour long. Using the automatic titrator, however, successive drops are added automatically, as called for by the sample, so that the operator is completely relieved during this long interval and available for other tasks.

While the invention has been shown in connection with a null-sensing voltage amplifier and has been exemplified as an automatic titrator, it will be clear that the principles of the invention find utility in other arts and irrespective of whether a null-sensing amplifier or any other type of amplifier is used.

Figure 12:
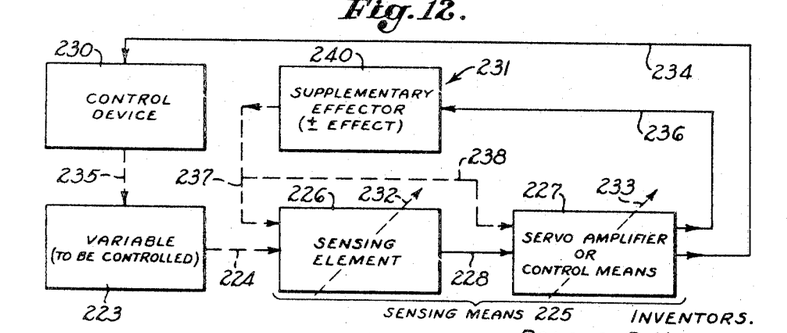
Fig. 12 is a diagrammatic view generically illustrating the invention.

The invention is generically illustrated diagrammatically in Fig. 12. Here the functions of each element will be described in generic terms and also with reference to three specific examples, other than the automatic titrator, merely by way of example, it being understood that the invention is not confined to these examples. These examples will involve: (a) controlling the spatial position of a heavy machine part to be moved rapidly to a precise limit without overshooting; (b) controlling the quantity of material to be weighed out or to be dispense to an accurate desired weight or volume; and (c) the problem of raising the temperature of a zone quickly to a certain value without exceeding the set limit.

Referring to Fig. 12, the variable to be controlled to a predetermined limit is indicated at 223 and may be any of the variables (a), (b) or (c) above. Displacement or change in the variable is characteristically unidirectional, as symbolized by arrow 224, and may also be irreversible. A sensing means 225 is capable of response to change in value or position of the controlled variable 223. This sensing means 225 is shown as including a sensing element 226 and a servo amplifier 227. In the above examples, the sensing element 226 under (a) may be a limit switch; under (b) a strain gage; and under (c) a thermocouple, these devices being presented merely as exemplary. The sensing element 226 responds to a given signal at any desired value of the variable 223.

The servo amplifier 227 may or may not be required in the system, depending upon its specific form. It is shown as a servo amplifier or other similar control device operating on a signal from the sensing element 226, suggested by the line 228, and having an output capable of energizing both a control device 230 and a supplementary means 231. The control device 230 is usually a two-position control device movable between "Stop" and "Continue" positions to respectively stop and continue changes in the variable 223, or between "Restraining" and "Permitting" positions to respectively hinder and allow changes in the variable 223. It may be, for example, a valve movable between such positions. Under (a) it may control movement of the heavy machine part;

under (b) the quantity of material to be weighed or dispensed; and under (c) the fuel or heating effect of a furnace. In controlling a mechanical displacement, as in (a), by use of a limit switch, for example, the servo amplifier 227 may be eliminated, the limit switch directly energizing the control device 230 and the supplementary means 231. In other instances where the servo amplifier 227 is used, it may operate on a voltage input derived, for example, from a strain gage under (b) or a thermocouple under (c), and may have a power output sufficient for a particular controling operation.

The sensing means 225 is preferably adjustable to respond to a given signal at any desired level of the variable 223. This may be accomplished by making the sensing element 226 variable, as suggested by the dotted arrow 232, or by making the servo amplifier 227 variable, as suggested by the dotted arrow 233. In either instance the output signal from the sensing means 225 will be at any desired input signal level. If the sensing element 226 is adjustable, the servo amplifier 227 may be a nonadjustable, two-state, trigger device, operated from the sensing element 226.

The control device 230 is operated from the sensing means 225 by any suitable operative connection suggested by the line 234. Under (a) the operative connection and the control device 230 may take the form of a pneumatic or hydraulic control effecting mechanical displacement, under (b) a material-controlling valve or under (c) a feed-control valve for fuel injection in a heating device, for example. The control device 230 in turn changes the variable 223 as suggested by the line 235.

The sensing means 225 or its servo amplifier 227 also acts via a connection 236 upon the supplementary means 231 which produces a fluctuating or ± effect transmitted additively to the sensing means 225, this transmission being either via a connection 237 to the sensing element or via a connection 238 to the servo amplifier.

The supplementary means 231 can be considered as producing a series of additive effects each followed by a removal of the effect or as producing an additive and retractive effect, transmitted to the sensing means 225 through the operative connections 237 or 238, the connection being additive. The additive effect combines with the signal of the sensing means 225 to cause the control device 230 prematurely to move to its "Stop" position. The retractive effect or the removal of the additive effect then acts upon the sensing means 225 to cause the control device 230 to move to its "Continue" position. The successive applications of additive effects, progressively smaller as the variable 223 approaches its predetermined or desired limit, produce a stepwise control of the control device 230.

The supplementary means 231 is shown as including a supplementary effector 240 which may produce its additive and retractive effects by use of a supplementary reversible motor, an RC network, etc. It generates a reversible or retractable effect, function or quantity applicable to the sensing means 225 and having an additive effect to that produced on the sensing means 225 by the controlled variable 223. The additive effect, symbolized by the connections 237, 238, may take the form, for mechanical displacement control, of a physically retractable member operatively connected to the sensing means to cause a premature arrival signal, or may be a supplementary retractable force, as the weight of a chain on a weighing platform, which affects a strain gage used as the sensing element, or may be a supplementary voltage or other electric value applied directly to the servo amplifier 227.

The mode of operation of such an arrangement will be clear from the previously-described specific embodiments. The sensing means 225 is preset to the desired limit to be reached by the variable 223. The supplementary effector 240 is preset to provide a suitable initial supplementary effect. Either automatically or otherwise the control device is set into motion to change the variable 223. When, on approach of the predetermined or set limit, the combined effects of the variable 223 and the supplementary effector 240 combine to give a signal to the sensing means 225 corresponding to the limit signal, the sensing means 225 will falsely respond to "arrival" at the limit. The sensing means 225 or its servo amplifier 227 will now (1) arrest further change in the variable 223 by actuating the control device 230, e. g., to its "Stop" position, and (2) operate upon the supplementary effector 240 to produce a retractive effect. After a sufficient interval of retraction, the sensing means 225, having had sufficient time to respond, will revert to its pre-arrival condition to actuate the control device 230, e. g., to its "Continue" position, and simultaneously cause the supplementary effector 240 to reapply its additive effect to the sensing means 225. The cycle of incremental changes in the variable 223 toward the desired limit, alternating with intervals of retraction of the supplementary effector 240, will occur until the desired limit has been accurately attained. As the variable comes closer and closer to its desired limit, the additive and retractive effects of the supplementary effector 240 will become progressively smaller and will reach zero when the variable 223 has accurately attained its desired limit.

Various changes and modifications can be made without departing from the spirit of the invention as defined in the appended claims.

We claim as our invention:

1. A method of titrating to an end point a batch of a solution by delivering thereto a reagent through a flow-control device shiftable between "on" and "off" positions respectively restraining and permitting flow of such reagent to said solution, said method involving the use of an electrode pair immersed in said batch of solution and producing a potential which changes progressively toward the potential thereof at said end point, which method includes the steps of: supplying a stream of said reagent to said batch of solution to change progressively the potential of said electrode pair; adding to said changing potential a supplementary potential, initially maintained at a substantially fixed value, until the sum of said potentials reaches a predetermined value; stopping the flow of said reagent when said sum reaches said predetermined value; decreasing the supplementary potential so that the sum of said potentials departs from said predetermined value; restarting the supply of reagent and increasing the supplementary potential until the sum of the supplementary potential and the potential of the electrode pair again reaches said predetermined value; then stopping the supply of said reagent; and repeating the successive decreasing and increasing of the supplementary potential added to the changing potential of the electrode pair until the potential of said electrode pair reaches said predetermined value and then stopping all further supply of said reagent, said starting and stopping of said flow of reagent being effected by respectively moving said flow-control device between its "on" and "off" positions.

2. A method of titrating to an end point a batch of a solution by delivering thereto a reagent through a flow-control device shiftable between "on" and "off" positions respectively restraining and permitting flow of such reagent to said solution, said method involving the use of an electrode pair immersed in said batch of solution and producing a potential which changes progressively toward the potential thereof at said end point, which method includes the steps of: supplying a stream of said reagent to said batch of solution to change progressively the potential of said electrode pair; adding to said changing potential a supplementary potential; stopping the flow of said reagent when the sum of said potentials reaches a predetermined value; decreasing the supplementary potential so that the sum of said potentials departs from said predetermined value; restarting the supply of reagent;

then increasing the supplementary potential until the sum of this supplementary potential and the potential of the electrode pair again reaches the said predetermined value; stopping the supply of said reagent; repeating the successive decreasing and increasing of the supplementary potential while progressively shortening the periods of increase and progressively lengthening the periods of decrease as the end point is approached; and stopping all further supply of said reagent when the potential of said electrode pair reaches said predetermined potential, said starting and stopping of said flow of reagent being effected by respectively moving said flow-control device between its "on" and "off" positions.

3. A method of bringing to an end point a batch of a solution by delivering a reagent thereto through a two-position fluid-conducting control device shiftable between "off" and "on" positions to restrain and permit delivery of said reagent to said batch of solution, said method involving the use of a sensing means responsive to changes in said batch of solution and producing a potential which changes progressively toward the potential thereof at said end point, which method includes the steps of: supplying a stream of said reagent to said batch of solution through said two-position control device while in "on" position to change progressively the potential of said sensing means toward said potential at said end point; adding to said changing potential a supplementary potential; stopping the flow of said reagent through said device by shifting same to "off" position when the sum of said potentials reaches a predetermined value; immediately changing the supplementary potential in such direction that the sum of such potentials departs from said predetermined value; restarting the supply of said reagent when said sum reaches another value; then immediately changing the supplementary potential in an opposite direction until the sum of the supplementary potential and the potential of said sensing means again reaches said predetermined value and then again stopping the flow of said reagent; and repeating the successive changes of the supplementary potential in such directions until the potential of the sensing means reaches said predetermined value and then stopping all further supply of said reagent.

4. An apparatus for bringing a variable to a predetermined limit without overshooting, said apparatus comprising: an electrically operable two-position flow-control device rapidly shiftable between "off" and "on" positions respectively restraining and permitting changes in said variable; a control circuit having input means and output means; means for operatively connecting said output means to said flow-control device; sensing means for generating an electric value responsive to changes in said variable; means for applying to said input means an input electric value which changes relatedly with said electric value produced by said sensing means; an RC circuit chargeable and dischargeable to produce a fluctuating output; means for timing the operation of said RC circuit in synchronism with the shifting of said flow-control device between said positions, said RC circuit being timed to charge for the duration of the "on" period of said flow-control device and to discharge for the duration of the "off" period of said flow-control device; and means for applying said fluctuating output to said control circuit to act with said input electric value in hastening and prematurely shifting said flow-control device to "off" position a plurality of times before remaining in said "off" position.

5. An apparatus as defined in claim 4 in which said control circuit includes an amplifier having two grids forming said input means, said input electric value being applied to one grid and said fluctuating output of said RC circuit being applied to the other grid.

6. An apparatus as defined in claim 4 in which said means for operatively connecting said output means to said flow-control device includes a relay with dual contact means, one of said contact means being operatively connected to said flow-control device and the other of said contact means being a part of said timing means, said other of said contact means being operatively connected to said RC circuit to control the charging and discharging thereof in step with the operation of said flow-control device.

7. An automatic titrator for bringing a batch of a sample solution to a desired end point condition by use of electrode means in contact with such sample solution and producing an electric value which varies as a reagent is added to the sample solution, said automatic titrator including in combination: a valve in the path of flow of said reagent to said sample solution; an electric control means for moving said valve between an open position in which the reagent flows through said valve to change said electric value rapidly and a closed position in which the flow of said reagent through said valve stops, said valve shifting substantially instantaneously between said open and closed positions respectively in response to receipt of valve-opening and valve-closing signals; circuit means connected to said electric control means to produce said valve-opening and valve-closing signals; and circuit control means connected to said circuit means for supplying thereto a potential varying with said electric value and also a pulsating potential including potential increments additive to such varying potential in its effect on said valve-closing signal, such varying potential and such potential increments prematurely producing a plurality of valve-closing signals with intervening valve-opening signals before said desired end point condition is reached, said circuit control means including means for synchronizing the growth and decay of said pulsating potential with said valve-opening and valve-closing signals, said circuit control means including means for progressively diminishing the magnitude of said potential increments as said electric value approaches the value thereof at said end point to supply said reagent in increments of continually decreasing volume as said end point is approached.

8. An automatic titrator as defined in claim 7 in which said circuit control means includes means for varying the relative duration of said valve-closing and valve-opening signals as said end point is approached, and means for rendering said circuit means inoperative to produce said valve-opening signals when the desired end point condition of said sample solution is reached.

9. An automatic titrator for bringing a batch of a sample solution to a desired end point condition by use of electrode means in contact with the sample solution to produce a measured electric value which varies as a reagent is added to the sample solution, said automatic titrator including in combination: a valve in the path of flow of said reagent to said sample solution; an electric control means for moving said valve substantially instantaneously between predetermined open and closed positions in response respectively to valve-opening and valve-closing signals; an adjustable source of potential; means for connecting said adjustable source in opposition to said electric value produced by said electrode means, thus producing a net potential which decreases as said electric value approaches the potential of said adjustable source and as the end point is approached; a pulsing means including an RC circuit chargeable to produce a growing potential and dischargeable to produce a decaying potential; means for charging and discharging said RC circuit synchronously with the movement of said valve between said positions; means for effectively adding said net potential and the changing potentials of said pulsing means to produce a series of valve-closing signals with intervening valve-opening signals; and means for transmitting said signals to said electric control means to actuate said valve correspondingly, said pulsing means including means for automatically varying the relative duration of said valve-closing and valve-opening signals as said end point is approached.

10. An automatic titrator as defined in claim 9 in which said means for effectively adding said net potential and said changing potentials includes a null-sensing amplifier including grid input means and means for supplying to said grid input means said net potential and said changing potentials of said pulsing means.

11. An automatic titrator as defined in claim 9 including means for reversing the polarity of said pulsing means to permit titrating both acid and alkali samples, in which samples the measured electric value changes in opposite sense when approaching said end point.

12. An automatic titrator for bringing a batch of a sample solution to an end point by controlled addition of a reagent to such solution in measurable volume until a desired end point condition is reached, said automatic titrator including in combination: means for developing an electric value which varies with the amount of said reagent added to said sample solution and which reaches a predetermined input value when the end point is reached; a valve in the path of flow of said reagent to said sample solution, said valve including an electric control means for shifting same substantially instantaneously between fixed positions, said positions being respectively an open and a closed position; an amplifier providing an input means and an output means; a relay having a control winding connected to said output means, said relay having first and second contact means actuatable upon change in energy level supplied to said control winding by said amplifier; means for operatively connecting one of said contact means to said electric control means of said valve to control the shifting of said valve between said positions in response to such change in energy supplied to said control winding; an RC circuit and means for operatively connecting same to the other of said contact means to produce a pulsing output varying in step with the shifting of said valve between said positions; and means for applying to said input means both the pulsing output of said RC circuit and a potential changing with changes in said electric value to repeatedly bring said amplifier prematurely to a valve-closing energy level until said pulsing output returns said amplifier to a valve-opening energy level, thus creating a series of closings and openings of said valve supplying increments of reagent of decreasing volume as said end point is approached.

13. An automatic titrator as defined in claim 12 in which said RC circuit is controlled by said second contact means to have intervals of growth when said second contact means is in one position and intervals of decay when said second contact means in in another position, and including phasing means for applying the growth intervals to said input means of said amplifier during the time said valve is open and decay intervals during the time said valve is closed.

References Cited in the file of this patent

UNITED STATES PATENTS

| | | |
|---|---|---|
| 1,530,833 | Keeler | Mar. 24, 1925 |
| 1,643,243 | Hatfield | Sept. 20, 1927 |
| 1,830,333 | Parker | Nov. 3, 1931 |
| 2,300,537 | Davis | Nov. 3, 1942 |
| 2,303,066 | Ray | Nov. 24, 1942 |
| 2,321,853 | Ray | June 15, 1943 |
| 2,525,016 | Borell | Oct. 10, 1950 |
| 2,566,210 | Kendal | Aug. 28, 1951 |
| 2,593,562 | Hornfeck | Apr. 22, 1952 |
| 2,613,053 | Dorrington | Oct. 7, 1952 |
| 2,632,846 | Hornfeck | Mar. 24, 1953 |
| 2,643,632 | Sigmon | June 30, 1953 |
| 2,648,305 | Appleman | Aug. 11, 1953 |
| 2,654,057 | Rivenburg | Sept. 29, 1953 |
| 2,666,691 | Robinson | Jan. 19, 1954 |
| 2,668,097 | Hallikainen | Feb. 2, 1954 |

OTHER REFERENCES

I and E. Chem., vol. 38 (1946), pages 544–6.

Lingane: Analytical Chemistry, vol. 20, No. 4, April 1948, pages 285–292.

Catalog: Schaar and Company, Chicago, Illinois, No. 50; May 9, 1950, page 671.